United States Patent
Hao et al.

(10) Patent No.: US 11,990,965 B2
(45) Date of Patent: May 21, 2024

(54) CQI REPORTING WITH PMI FREQUENCY DOMAIN UNITS

(71) Applicants: QUALCOMM Incorporated, San Diego, CA (US); Chenxi Hao, Beijing (CN); Yu Zhang, Beijing (CN)

(72) Inventors: Chenxi Hao, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/424,819

(22) PCT Filed: Jan. 23, 2020

(86) PCT No.: PCT/CN2020/073958
§ 371 (c)(1),
(2) Date: Jul. 21, 2021

(87) PCT Pub. No.: WO2020/151760
PCT Pub. Date: Jul. 30, 2020

(65) Prior Publication Data
US 2022/0014249 A1 Jan. 13, 2022

(30) Foreign Application Priority Data
Jan. 23, 2019 (WO) ................ PCT/CN2019/072870

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/0632* (2013.01); *H04B 7/0639* (2013.01)

(58) Field of Classification Search
CPC .. H04B 7/0626; H04B 7/0417; H04B 7/0632; H04B 7/0639
See application file for complete search history.

(56) References Cited

U.S. PATENT DOCUMENTS 9,614,655 B2 * 4/2017 Kim ................... H04B 7/0486
11,362,707 B2 * 6/2022 Jin ..................... H04B 7/0456
(Continued)

FOREIGN PATENT DOCUMENTS

CN 105359569 A * 2/2016 ............. H04B 7/022
EP 2498417 B1 9/2018
(Continued)

OTHER PUBLICATIONS

Mediatek Inc: "CSI Enhancement for MU-MIMO", 3GPP TSG RAN WG1 Ad-Hoc Meeting 1901, R1-1900216 Type II Final, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019 Jan. 20, 2019, XP051593139, 17 Pages.
(Continued)

*Primary Examiner* — Michael J Moore, Jr.
(74) *Attorney, Agent, or Firm* — QUALCOMM Incorporated

(57) ABSTRACT

Certain aspects of the present disclosure provide techniques for channel quality indictor (CQI) reporting with precoding matrix indicator (PMI) frequency domain (FD) units. A user equipment (UE) may configured with a CSI reporting configuration. CQI and PMI may be configured with different FD unit sizes. The UE may determine which PMI FD units to use for calculating corresponding CQI FD units. PMI and CQI FD units may not be aligned. The UE may determine which PMI FD units to use for calculating CQI based on the alignment. PMI and CQI FD units may be configured using a separate bitmaps, a bitmap and ratio of the FD unit sizes,
(Continued)

or a single bitmap. PMI and/or CQI FD units may start from a lowest FD unit index in the system bandwidth, or the lowest FD unit index within a configured bandwidth part (BWP).

30 Claims, 12 Drawing Sheets

(56) References Cited

U.S. PATENT DOCUMENTS

| | | | |
|---|---|---|---|
| 2008/0273624 A1* | 11/2008 | Kent | H04B 7/0632 |
| | | | 375/296 |
| 2013/0343216 A1* | 12/2013 | Su | H04B 7/0417 |
| | | | 370/252 |
| 2014/0016496 A1 | 1/2014 | Su et al. | |
| 2014/0029463 A1* | 1/2014 | Su | H04L 1/0026 |
| | | | 370/252 |
| 2015/0327246 A1 | 11/2015 | Kim et al. | |
| 2016/0227530 A1 | 8/2016 | Davydov et al. | |
| 2016/0329945 A1* | 11/2016 | Onggosanusi | H04B 7/0626 |
| 2017/0155435 A1* | 6/2017 | Zhu | H04B 7/0452 |
| 2019/0280750 A1* | 9/2019 | Rahman | H04L 25/03923 |
| 2020/0235790 A1* | 7/2020 | Rahman | H04L 5/0051 |
| 2022/0014249 A1* | 1/2022 | Hao | H04B 7/0626 |
| 2022/0014251 A1* | 1/2022 | Wang | H04B 7/0478 |
| 2022/0014337 A1* | 1/2022 | Ouchi | H04W 74/0808 |
| 2022/0103209 A1* | 3/2022 | Hao | H04B 7/0456 |
| 2022/0109480 A1* | 4/2022 | Hao | H04L 5/0057 |
| 2022/0271814 A1* | 8/2022 | Hao | H04B 7/0639 |

FOREIGN PATENT DOCUMENTS

| | | | | |
|---|---|---|---|---|
| WO | WO-2019108048 A1 | * | 6/2019 | H04B 7/0404 |
| WO | WO-2020143057 A1 | * | 7/2020 | H04L 1/1812 |
| WO | 2021087844 A1 | | 5/2021 | |

OTHER PUBLICATIONS

Qualcomm Incorporated: "CSI Enhancement for MU-MIMO Support", 3GPP TSG RAN WG1 Meeting #NRAH1901, R1-1900904, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019 Jan. 20, 2019, XP051593750, 15 Pages.
Supplementary European Search Report—EP20745604—Search Authority—Munich—dated Aug. 8, 2022.
Huawei et al., "Remaining Issues on CSI Measurement" 3GPP TSG RAN WG1 Meeting #93, R1-1805949, May 25, 2018 (May 25, 2018), 6 Pages.
International Search Report and Written Opinion—PCT/CN2019/072870—ISA/EPO—dated Oct. 23, 2019.
International Search Report and Written Opinion—PCT/CN2020/073958—ISA/EPO—dated Apr. 21, 2020.
Samsung: "Outcome of Offline Session for CSI Enhancement for MU-MIMO Support," R1-1814131, 3GPP TSG RAN WG1 Meeting #95, Nov. 16, 2018 (Nov. 16, 2018), section 2, 3 pages.

* cited by examiner

| BWP size (RBs) | Subband size (RBs) |
|---|---|
| < 24 | N/A |
| 24 - 72 | 4, 8 |
| 73 - 144 | 8, 16 |
| 145 - 275 | 16, 32 |

| # of configured FD units | Solution | # of configured FD units | Solution |
|---|---|---|---|
| 7 | Padding 1 to 8 | 19 | Padding 1 to 20 |
| 11 | Padding 1 to 12 | 23 | Seg: (1 to 12) + (12 to 23) [1] |
| 13 | Padding 2 to 15 | 29 | Seg: (1 to 15) + (15 to 29) [1] |
| 14 | Padding 1 to 15 | 31 | Seg: (1 to 16) + (16 to 31) [1] |
| 17 | Padding 1 to 18 | 33 | Seg: (1 to 18) + (16 to 33) [3] |
| 21 | Seg: (1 to 12) + (10 to 21) [3] | 34 | Seg: (1 to 18) + (17 to 34) [2] |
| 22 | Seg: (1 to 12) + (11 to 22) [2] | 35 | Seg: (1 to 18) + (18 to 35) [1] |
| 26 | Seg: (1 to 15) + (12 to 26) [4] | 37 | Seg: (1 to 20) + (18 to 37) [3] |
| 28 | Seg: (1 to 15) + (14 to 28) [2] | 38 | Seg: (1 to 20) + (19 to 38) [2] |

FIG. 6

CQI REPORTING WITH PMI FREQUENCY DOMAIN UNITS

CROSS-REFERENCE TO RELATED APPLICATION(S)

This application is a national stage application under 35 U.S.C. 371 of PCT/CN2020/073958, filed Jan. 23, 2020, which claims benefit of and priority to International Application No. PCT/CN2019/072870, filed Jan. 23, 2019, which i-s are both hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for channel quality indictor (CQI) reporting with precoding matrix indicator (PMI) frequency domain (FD) units.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) reporting configuration. The CSI includes channel quality information (CQI) and precoder matrix indicator (PMI) feedback. The method generally includes determining a configured subband size for the CQI feedback and a number of frequency domain (FD) units configured for the PMI feedback corresponding to the subband size for the CQI feedback. The method generally includes calculating the CQI feedback for CQI subbands based on at least a portion of the corresponding number of FD units for the PMI feedback. The portion of the number of FD units is based on alignment of the CQI subbands and the number of FD units for the PMI feedback.

Certain aspects provide a method for wireless communication by a base station (BS). The method generally includes configuring a UE with a CSI reporting configuration. The CSI includes CQI and PMI feedback. The method generally includes determining a configured subband size for the CQI feedback and a number of FD units configured for the PMI feedback corresponding to the subband size for the CQI feedback. The method generally includes receiving a CSI report from the UE. The method generally includes determining the FD units associated with the CQI feedback based on alignment of the CQI subbands and the number of FD units for the PMI feedback.

Certain aspects provide an apparatus for wireless communication. The apparatus generally includes means for receiving a CSI reporting configuration. The CSI includes CQI and PMI feedback. The apparatus generally includes means for determining a configured subband size for the CQI feedback and a number of FD units configured for the PMI feedback corresponding to the subband size for the CQI feedback. The apparatus generally includes means for calculating the CQI feedback for CQI subbands based on at least a portion of the corresponding number of FD units for the PMI feedback. The portion of the number of FD units is based on alignment of the CQI subbands and the number of FD units for the PMI feedback.

Certain aspects provide another apparatus for wireless communication. The apparatus generally includes means for configuring a UE with a CSI reporting configuration. The CSI includes CQI and PMI feedback. The apparatus generally includes means for determining a configured subband size for the CQI feedback and a number of FD units configured for the PMI feedback corresponding to the subband size for the CQI feedback. The apparatus generally includes means for receiving a CSI report from the UE. The apparatus generally includes means for determining the FD units associated with the CQI feedback based on alignment of the CQI subbands and the number of FD units for the PMI feedback.

Certain aspects provide an apparatus for wireless communication. The apparatus generally includes a memory and at least one processor coupled to the memory. The at least one processor is generally configured to receive a CSI reporting configuration. The CSI includes CQI and PMI feedback. The at least one processor is generally configured to determine a configured subband size for the CQI feedback and a number of FD units configured for the PMI feedback corresponding to the subband size for the CQI feedback. The at least one processor is generally configured to calculate the CQI feedback for CQI subbands based on at least a portion of the corresponding number of FD units for the PMI feedback. The portion of the number of FD units is based on alignment of the CQI subbands and the number of FD units for the PMI feedback.

Certain aspects provide an apparatus for wireless communication. The apparatus generally includes a memory and at least one processor coupled to the memory. The at least one processor is generally configured to configure a UE with a CSI reporting configuration. The CSI includes CQI and PMI feedback. The at least one processor is generally configured to determine a configured subband size for the CQI feedback and a number of FD units configured for the PMI feedback corresponding to the subband size for the CQI feedback. The at least one processor is generally configured to receive a CSI report from the UE. The at least one processor is generally configured to determine the FD units associated with the CQI feedback based on alignment of the CQI subbands and the number of FD units for the PMI feedback.

Certain aspects provide a computer readable medium having computer executable code stored thereon for wireless communication. The computer readable medium generally includes code for receiving a CSI reporting configuration. The CSI includes CQI and PMI feedback. The computer readable medium generally includes code for determining a configured subband size for the CQI feedback and a number of FD units configured for the PMI feedback corresponding to the subband size for the CQI feedback. The computer readable medium generally includes code for calculating the CQI feedback for CQI subbands based on at least a portion of the corresponding number of FD units for the PMI feedback. The portion of the number of FD units is based on alignment of the CQI subbands and the number of FD units for the PMI feedback.

Certain aspects provide a computer readable medium having computer executable code stored thereon for wireless communication. The computer readable medium generally includes code for configuring a UE with a CSI reporting configuration. The CSI includes CQI and PMI feedback. The computer readable medium generally includes code for determining a configured subband size for the CQI feedback and a number of FD units configured for the PMI feedback corresponding to the subband size for the CQI feedback. The computer readable medium generally includes code for receiving a CSI report from the UE. The computer readable medium generally includes code for determining the FD units associated with the CQI feedback based on alignment of the CQI subbands and the number of FD units for the PMI feedback.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 is a table 600 illustrating examples of resource band segmentation for CSI reporting, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
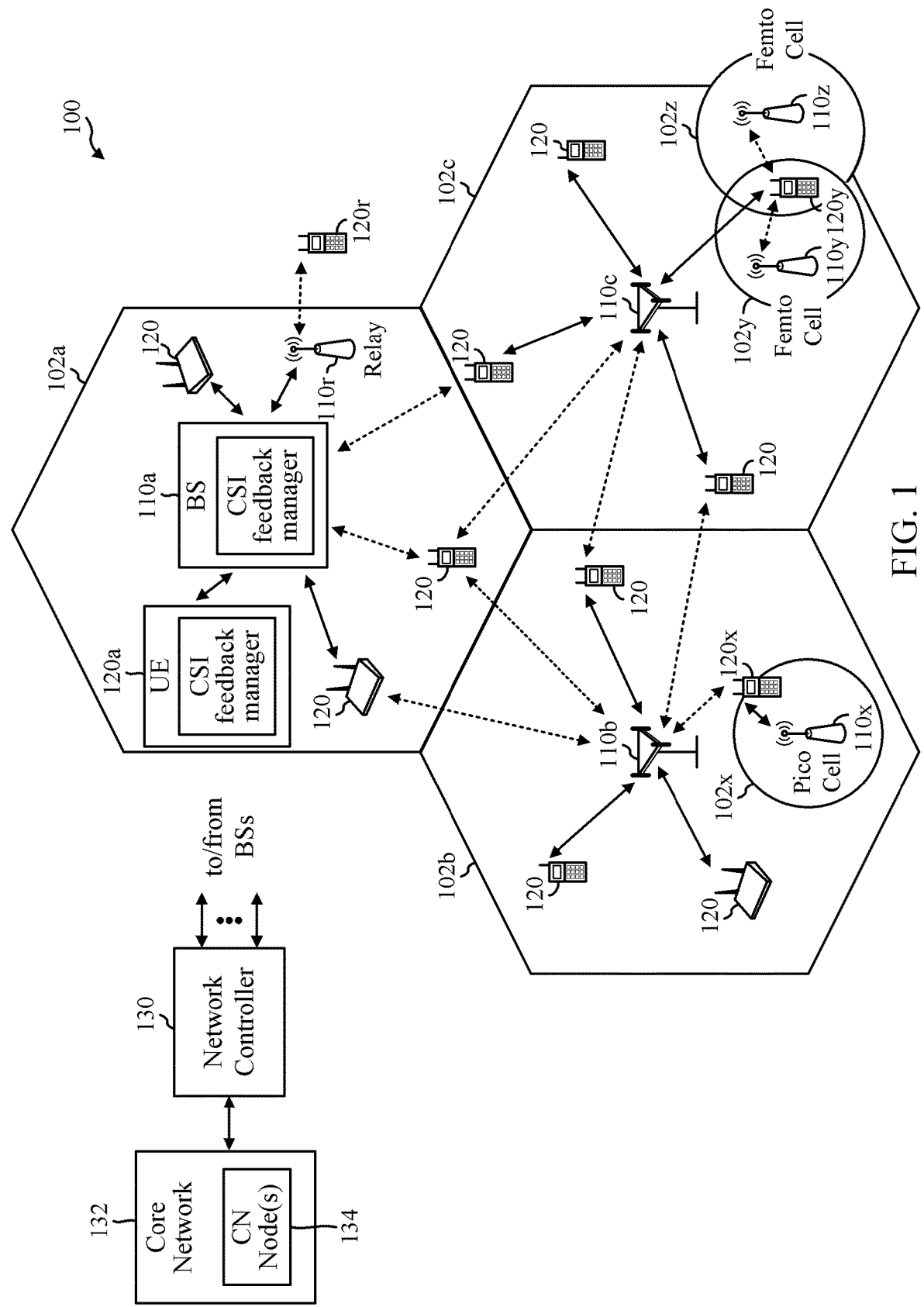
FIG. 1 is a block diagram conceptually illustrating an example telecommunications system, in accordance with certain aspects of the present disclosure.

Aspects of the present disclosure provide apparatus, methods, processing systems, and computer readable mediums for channel quality indictor (CQI) reporting with precoding matrix indicator (PMI) frequency domain (FD) units. CQI is calculated based on PMI. In some cases, CQI and PMI have different FD unit sizes.

The following description provides examples of CQI reporting with PMI FD units, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

New radio (NR) access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may support beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a New Radio (NR) or 5G network. As shown in FIG. 1, the wireless communication network 100 may be in communication with a core network 132. The core network 132 may be in communication with one or more base stations (BSs) 110 and/or user equipment (UE) 120 in the wireless communication network 100 via one or more interfaces.

As illustrated in FIG. 1, the wireless communication network 100 may include a number of BSs 110 and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BS or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. A BS 110 may support one or multiple cells. A network controller 130 may couple to a set of BSs and provide coordination and control for these BSs. The network controller 130 may communicate with the BSs 110 via a backhaul.

The BSs 110 may communicate with UEs 120 (e.g., 120$x$, 120$y$, etc.) which may be dispersed throughout the wireless communication network 100. Each UE 120 may be stationary or mobile. Wireless communication network 100 may also include relay stations that receive a transmission of data and/or other information from an upstream station (e.g., a BS 110$a$ or a UE 120$r$) and send a transmission of the data and/or other information to a downstream station (e.g., a UE 120 or a BS 110) and/or that relays transmissions between UEs 120.

The BSs 110 and UEs 120 may be configured for CQI reporting with PMI FD units. As shown in FIG. 1, the UE 120$a$ may include a CSI feedback manager 122. The BS 110$a$ may include a CSI feedback manager 112. The CSI feedback manager 122 and/or the CSI feedback manager 112 may be configured for CQI reporting with PMI FD units in accordance with aspects of the disclosure.

Figure 2:
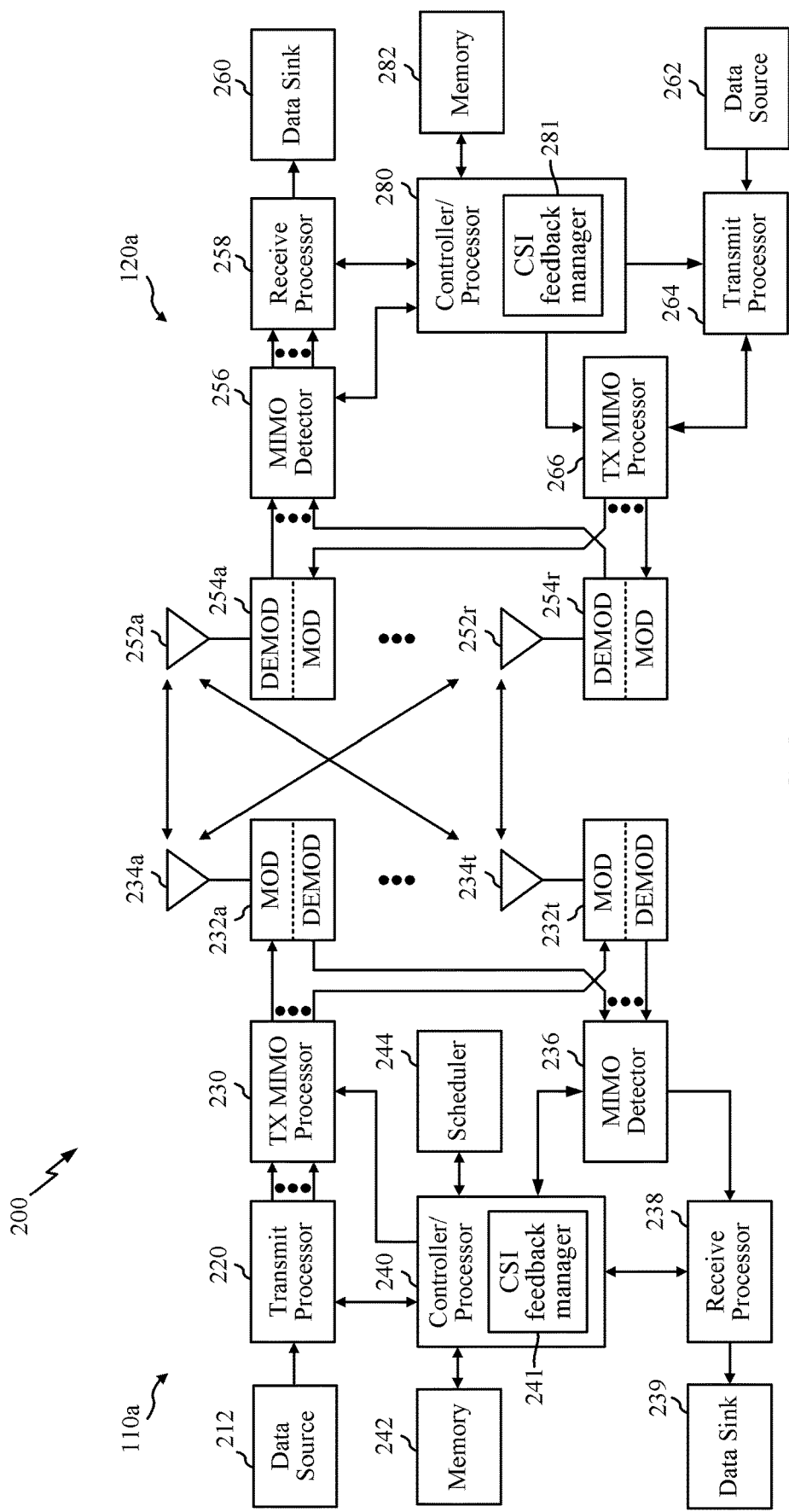
FIG. 2 is a block diagram conceptually illustrating a design of an example base station (BS) and user equipment (UE), in accordance with certain aspects of the present disclosure.

FIG. 2 illustrates example components of BS 110$a$ and UE 120$a$ (as depicted in FIG. 1), which may be used to implement aspects of the present disclosure. At the BS 110$a$, a transmit processor 220 may receive data from a data source 212 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232$a$ through 232$t$. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232$a$ through 232$t$ may be transmitted via the antennas 234$a$ through 234$t$, respectively.

At the UE 120*a*, the antennas 252*a* through 252*r* may receive the downlink signals from the BS 110*a* and may provide received signals to the demodulators (DEMODs) in transceivers 254*a* through 254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a* through 254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein for CQI reporting with PMI FD units. The controllers/processors 240 and 280 may direct the operation at the BS 110*a* and the UE 120*a*, respectively. The processor 240 and/or other processors and modules at the BS 110*a* may perform or direct the execution of processes for the techniques described herein. As shown in FIG. 2, the controller/processor 280 of the UE 120*a* includes a CSI feedback manager 281. The controller/processor 240 of the BS 110*a* includes a CSI feedback manager 241. The CSI feedback manager 241 and/or the CSI feedback manager 281 may be configured for CQI reporting with PMI FD units in accordance with aspects of the disclosure. The memories 242 and 282 may store data and program codes for BS 110*a* and UE 120*a*, respectively. A scheduler 244 may schedule UEs for data transmission on the downlink and/or uplink.

NR may utilize orthogonal frequency division multiplexing (OFDM) on the uplink and/or downlink and single-carrier frequency division multiplexing (SC-FDM) on the downlink and/or uplink. NR may support half-duplex operation using time division duplexing (TDD). OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. For example, the base subcarrier spacing (SCS) may be 15 kHz and other subcarrier spacing may be defined with respect to the base SCS, for example, 30 kHz, 60 kHz, 120 kHz, 240 kHz, etc. The minimum resource allocation (called a "resource block" (RB)) may be 12 consecutive subcarriers. The system bandwidth may also be partitioned into sub-bands covering multiple RBs.

Figure 3:
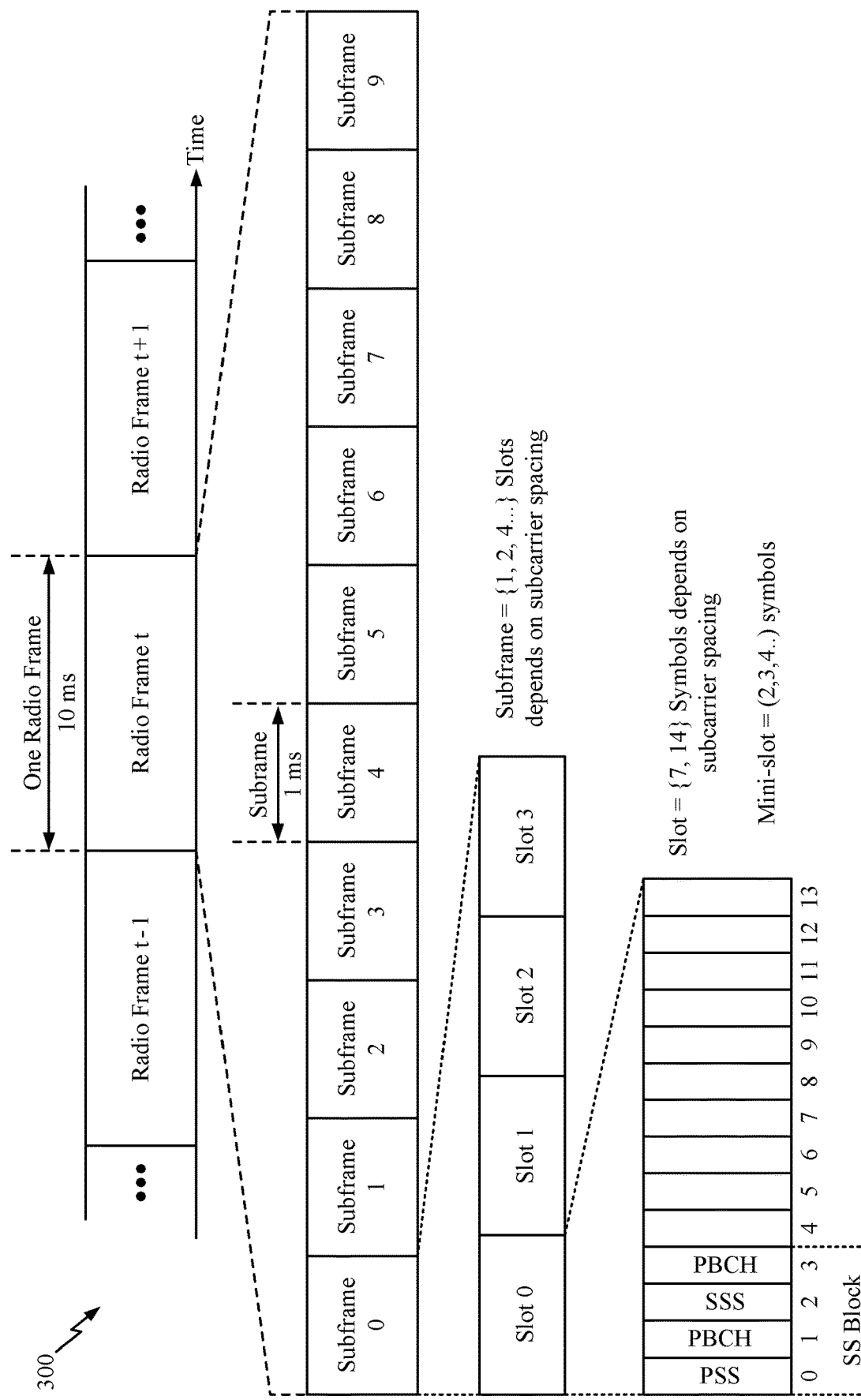
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP.

The network (e.g., a BS), may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. Three codebooks include Type I single panel, Type I multi-panel, and Type II single panel. Regardless which codebook is used, the CSI report may include the CQI, PMI, CRI, and/or RI. The structure of the PMI may vary based on the codebook. The CRI, RI, and CQI may be in a first part (Part I) and the PMI may be in a second part (Part II) of the CSI report. For the Type I single panel codebook, the PMI may consist of a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

As discussed above, a UE may be configured for CSI reporting, for example, by receiving a CSI configuration. In certain system (e.g., Release 15 5G NR), the UE may be configured to report at least a Type II precoder across configured frequency domain (FD) units:

$$w_r = \sum_{i=0}^{2L-1} b_i \cdot c_i,$$

where $$c_i = \left[ \underbrace{c_{i,0} \cdots c_{i,N_3-1}}_{N_3} \right],$$

where $b_i$ is the selected beam, $c_i$ is the set of linear combination coefficients, L is the number of selected spatial beams, and $N_3$ corresponds to the number of frequency units (e.g., subbands, resource blocks (RBs), etc.). In certain systems (e.g., Rel-16 5G NR), the UE may be configured to report compressed precoder feedback:

$$w_r = \sum_{i=0}^{2L-1} b_i \tilde{c}_i \cdot F_i^H,$$

where the discrete Fourier transform (DFT) compression basis is given by:

$$F_i^H = \begin{bmatrix} f_{i,0}^H \\ f_{i,1}^H \\ \vdots \\ f_{i,N_3-1}^H \end{bmatrix} \text{ of size } M_i \times N_3,$$

where $M_i$ is dimension of the compressed domain. The coefficients are given by:

$$\tilde{c}_i = \left[ \underbrace{\tilde{c}_{i,0} \cdots \tilde{c}_{i,M_i-1}}_{M_i} \right],$$

and the dimension of the compressed domain is $M_i < N_3$.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

Figures 4, 5:
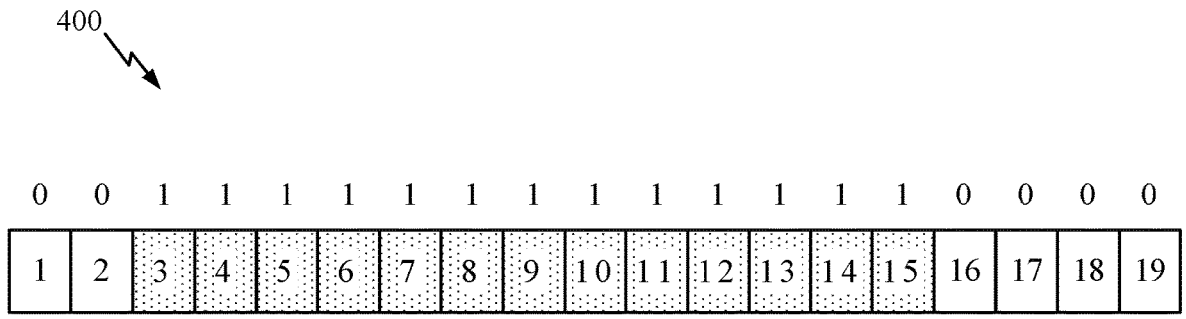
FIG. 4 shows example subbands configured for channel state information (CSI) reporting, in accordance with certain aspects of the present disclosure.
FIG. 5 is an example table showing subband sizes for bandwidth parts (BWPs) and associated subband sizes, in accordance with certain aspects of the present disclosure.

The UE may further receive an indication of the subbands for which the CSI feedback is requested. FIG. 4 shows example subbands configured for CSI reporting, in accordance with certain aspects of the present disclosure. In the example shown in FIG. 4, 13 of the 19 total subbands are requested for CSI reporting. In some examples, a subband mask is configured for the requested subbands for CSI reporting (subbands 3-15). The UE computes precoders for each requested subband and finds the PMI that matches the computed precoder on each of the subbands.

In certain systems (e.g., Rel-15 5G NR) for CSI reporting, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$, contiguous physical resource blocks (PRBs) and depends on the total number of PRBs in the bandwidth part, for example, as shown in the table 500 illustrated in FIG. 5. As shown in the table 500, in such systems, the maximum number of subbands may be 19 subbands.

In certain systems (e.g., Rel-16 and beyond), a finer granularity can be used for CSI. For example, a subband size for PMI may be smaller than the subband sizes shown in FIG. 5. The finer CSI granularity may lead to much larger CSI computation complexity than larger CSI granularity.

According to certain aspects, the UE may be configured to report PMI. As discussed above, the CSI configuration may be associated with a BWP, and the BWP may be associated with a bandwidth size and subband size. According to certain aspects, the CSI granularity (e.g., the PMI) spans X RBs. As discussed above, the frequency division (FD) unit size may be a fine granularity. For example, the subband size may be smaller than the subband sizes shown in FIG. 5. In some examples, granularity may be as small as 1 RB or {2,4} configured by higher-layers. In some examples, the PMI granularity may be smaller than a CQI granularity. For example, X=(CQI subband size)/R, where R>1 is a predefined integer. Thus, the number of FD units (e.g., the number of subbands) may be up to the total number of configured subbands*R (e.g., 19R).

Figure 7:
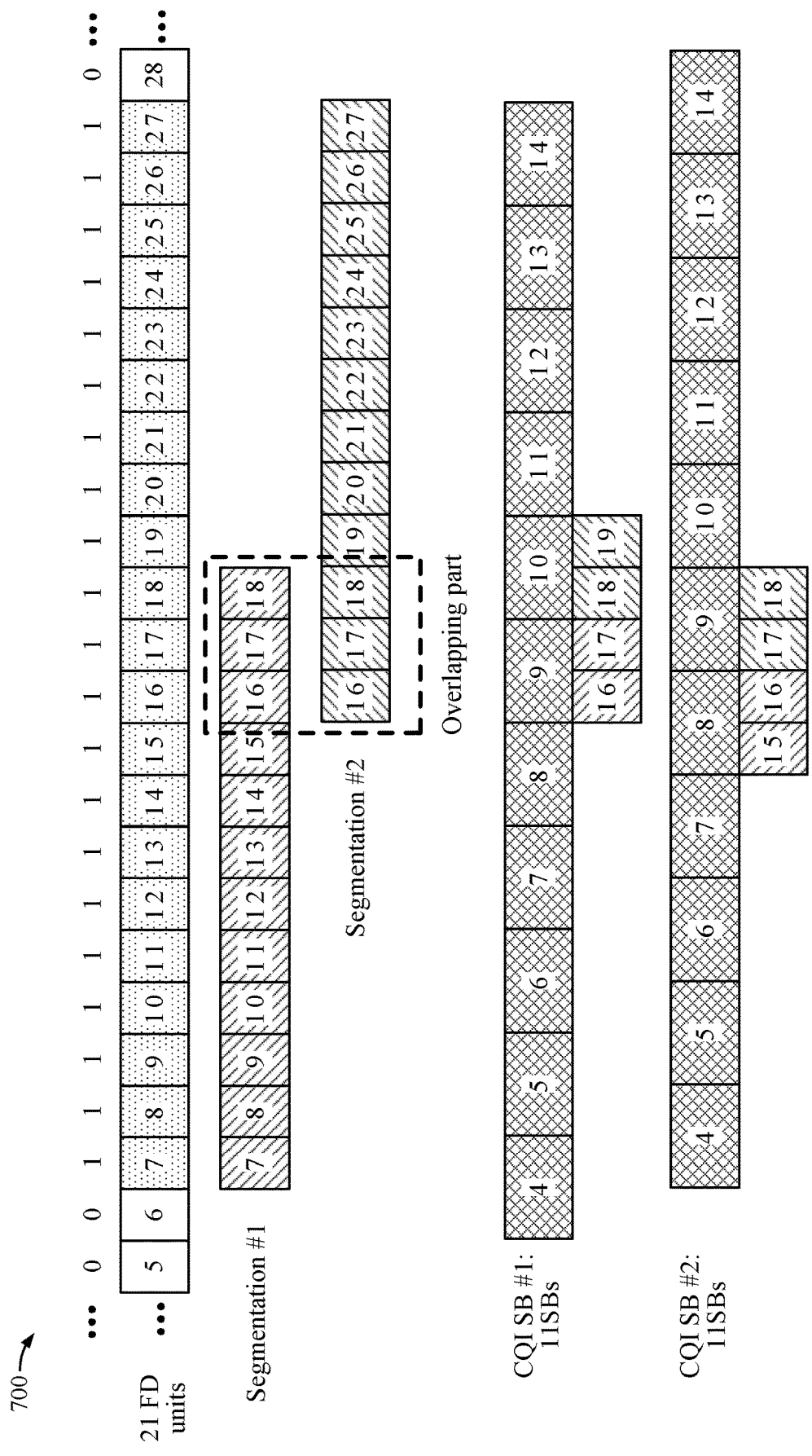
FIG. 7 illustrates an example segmentation of frequency domain (RD) units for CSI reporting, in accordance with certain aspects of the present disclosure.

In some cases, to enhance compression performance for the compressed CSI feedback, the CSI reporting band may divided into segments (e.g., into two segments). FIG. 6 is a table 600 illustrating examples of resource band segmentation for CSI reporting and FIG. 7 illustrates an example segmentation of FD units for CSI reporting. Frequency domain compression may be performed separately for each of the segments. As shown in FIG. 5 and FIG. 7, the segments may overlap. Precoder (e.g., PMI) calculation may be performed separately for each segment and reported (e.g., the beam matrix, coefficient matrix, and basis selection).

Example CQI Reporting with PMI FD Units

Aspects of the present disclosure provide techniques for channel quality indicator (CQI) feedback reporting with precoder matrix indicator (PMI) frequency domain (FD) units (e.g., fine granularity PMI FD units).

FIGS. 8, 9, 11, and 12 are flow diagrams illustrating example operations 800, 900, 1100, and 1200, respectively, for wireless communication in accordance with certain aspects of the present disclosure. The operations 800, 900, 1100, and/or 1200 may be performed, for example, by UE (e.g., such as a UE 120a in the wireless communication network 100). Operations 800, 900, 1100, and/or 1200 may be implemented as software components that are executed and run on one or more processors (e.g., processor 280 of FIG. 2). Further, the transmission and reception of signals by the UE in operations 800, 900, 1100, and/or 1200 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

Figure 8:
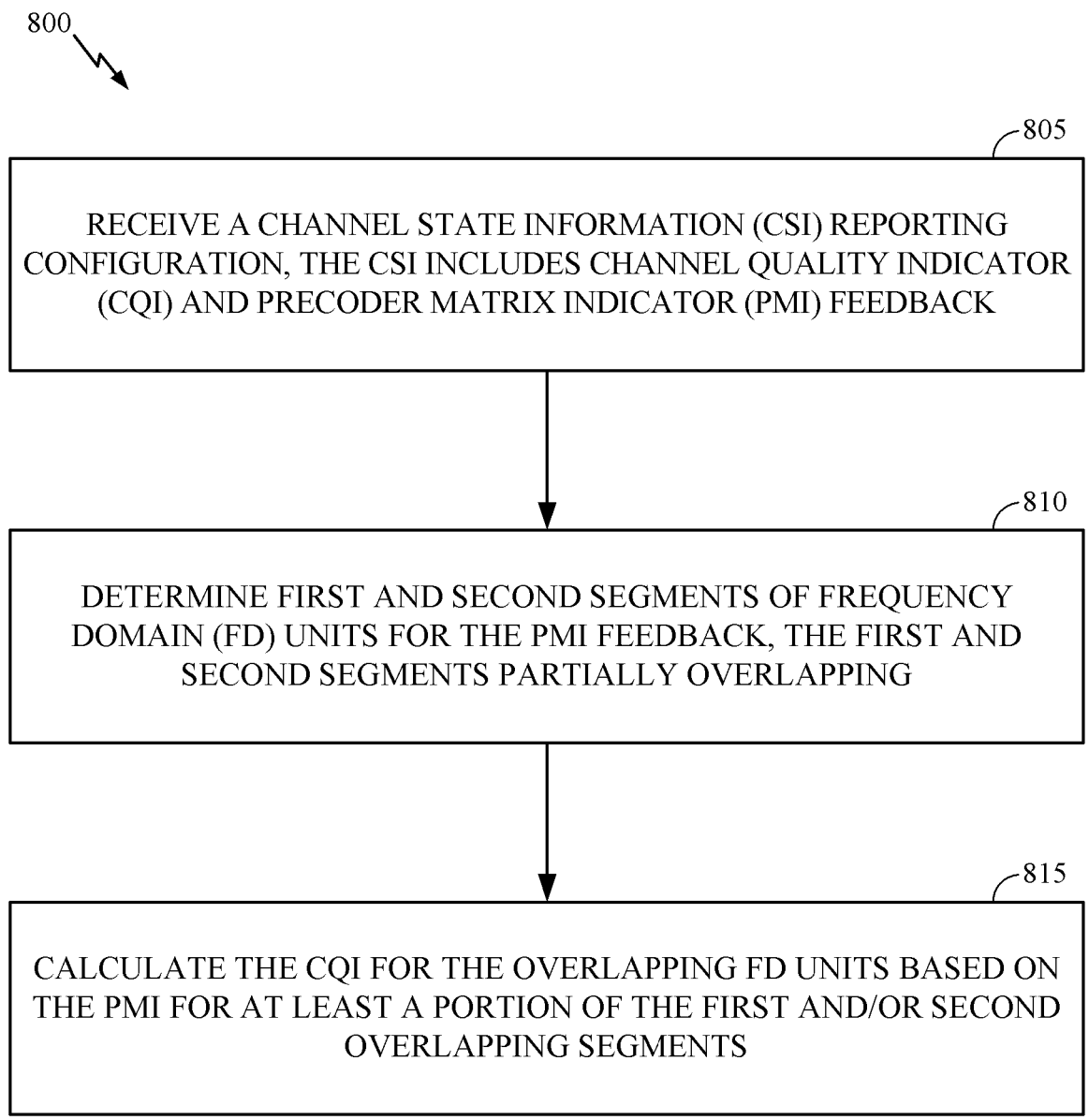
FIG. 8 is a flow diagram illustrating example operations by a UE for wireless communication, in accordance with certain aspects of the present disclosure.

According to certain aspects, as shown in FIG. 7, PMI FD units segments may be overlapping. Aspects of the present disclosure provide techniques for calculating CSI, such as the CQI, for the overlapping parts of the segments. FIG. 8 is a flow diagram illustrating example operations 800 for calculating CQI for the overlapping segments, in accordance with certain aspects of the present disclosure.

The operations 800 may begin, at 805, by receiving a CSI reporting configuration. The CSI includes CQI and PMI feedback. The CSI report may indicate or be associated with a BWP. The BWP may be associated with one or more FD unit sizes.

At 810, the UE determines first and second segments of FD units for the PMI feedback. The first and second segments partially overlap. The UE may also determine FD units (e.g., subbands) for reporting the CQI. The FD units for the PMI feedback have first a FD unit size smaller (e.g., less RBs in an FD unit) than a second FD unit size for the CQI (i.e., the PMI may have a finer granularity than the CQI). In some examples, the FD unit sizes for the CQI and/or the PMI are indicated in the CSI report configuration and/or associated with the BWP. In some examples, the UE receives an indication of the requested FD units for CQI and/or PMI reporting.

At 815, the UE calculates the CQI for the overlapping FD units based on the PMI for at least a portion of the first and/or second overlapping segments. In some examples, the UE calculates the CQI based on the average CQI resulted by the PMIs for the corresponding FD units.

According to certain aspects, the UE calculates the CQI based on the PMI for the corresponding FD units in the segment starting with a lower FD unit index. In the example shown in FIG. 7, the UE calculates the CQI for the overlapping FD units 16-18 based on the average of the PMIs obtained by the PMIs from the FD units 16-18 of the segmentation #1.

According to certain aspects, the UE calculates the CQI based on the PMI for the corresponding FD units in the segment starting with a higher FD unit index. In the example shown in FIG. 7, the UE calculates the CQI for the overlapping FD units 16-18 based on the average of the PMIs obtained by the PMIs from the FD units 16-18 of the segmentation #2.

According to certain aspects, the UE calculates the CQI based on the PMI for the corresponding FD units in both of the segments. In the example shown in FIG. 7, the UE calculates the CQI for the overlapping FD units 16-18 based on the average of the PMIs obtained by the PMIs from the FD units 16-18 of both the segmentation #1 and the segmentation #2.

According to certain aspects, the UE calculates the CQI based on the PMI for the corresponding FD units in the segment having more FD units than the other segment. In the example shown in FIG. 7, the segmentation #1 and the segmentation #2 have the same number of FD units (12 FD units). However, the segmentation #1 and the segmentation #2 could have different numbers of FD units. In that case, the UE calculates the CQI for the overlapping FD units 16-18 based on the average of the PMIs obtained by the PMIs from the FD units 16-18 of the longer segment (i.e., having more FD units).

According to certain aspects, the UE calculates the CQI for a first portion of the overlapping FD units based on the PMI for the corresponding FD units in the segment starting with a lower FD index, and calculates the CQI for a second portion of the overlapping FD units based on the PMI for the corresponding FD units in the segment starting with a higher FD unit. The first portion and second portion of the overlapping FD units can be determined based at least in part on an association between the CQI reporting band configuration and PMI reporting band configuration. In the example shown in FIG. 7, the UE calculates the CQI for the first portion of the overlapping FD units (e.g., FD units 16 or 16-17) based on the average of the PMIs obtained by the PMIs from the corresponding FD units (e.g., FD units 16 or 16-17) of the segmentation #1, having the lower starting FD unit index; and the UE calculates the CQI for the second portion of the overlapping FD units (e.g., FD units 18 or 17-18) based on the average of the PMIs obtained by the PMIs from the corresponding FD units (e.g., FD units 18 or 17-18) of the segmentation #2, having the higher starting FD unit index. The number of PMI FD units in the first and second portions are dependent on the relationship CQI SB grid and PMI FD unit grid. In the example shown in FIG. 7, for the CQI subband configuration #1, the first portion includes FD units 16 and 17 (because they align with the CQI subband 9) and the second portion includes FD unit 18 (because CQI subband 10 is only partially aligned with the overlapping PMI FD units); and for the CQI subband configuration #2, the first portion includes FD unit 16 (because CQI subband 8 is only partially aligned with the overlapping PMI FD units) and the second portion includes FD units 17 and 18 (because CQI subband 9 aligns with those PMI FD units).

Figure 9:
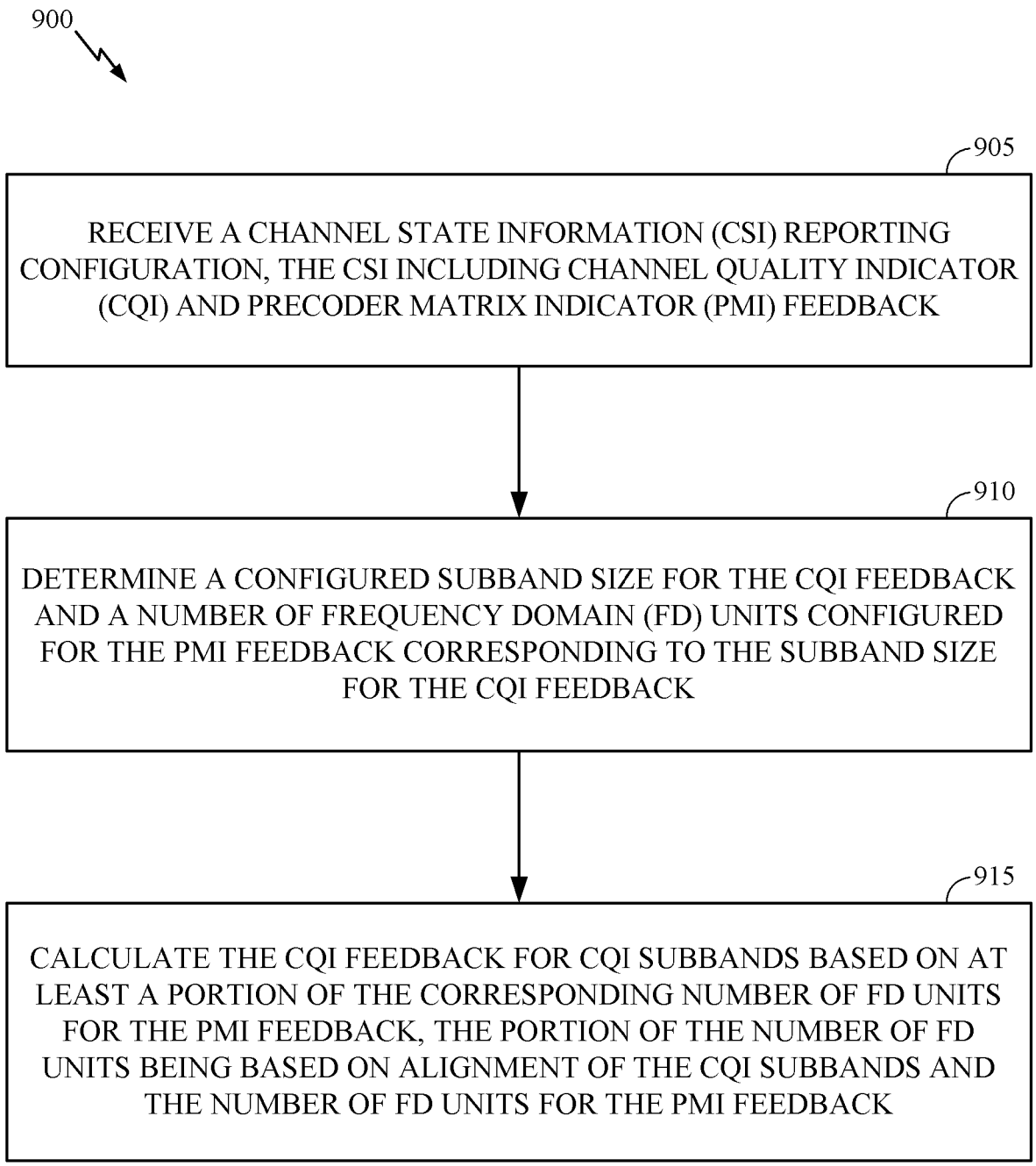
FIG. 9 is a flow diagram illustrating example operations by a UE for wireless communication, in accordance with certain aspects of the present disclosure.

According to certain aspects, as shown in FIG. 7, PMI FD units segments may not be perfectly aligned with the CQI FD units. Aspects of the present disclosure provide techniques for calculating CSI, such as the CQI, based on the alignment. FIG. 9 is a flow diagram illustrating example operations 900 for calculating CQI based on the alignment of the CQI and PMI FD units, in accordance with certain aspects of the present disclosure.

The operations 900 may begin, at 905, by receiving a CSI reporting configuration. The CSI includes CQI and PMI feedback. The CSI report may indicate or be associated with a BWP. The BWP may be associated with one or more FD unit sizes.

At 910, the UE determines a configured subband size for the CQI feedback and a number of FD units configured for the PMI feedback corresponding to the subband size for the CQI feedback. The FD units for the PMI feedback can have first a FD unit size smaller (e.g., less RBs in an FD unit) than the subband size for the CQI (i.e., the PMI may have a finer granularity than the CQI). In some examples, the configured subband size for the CQI and/or the PMI are indicated in the CSI report configuration and/or are associated with the configured BWP. In some examples, the UE receives an indication (e.g., one or more FD unit or subband masks) of the requested FD units for CQI and/or PMI reporting. As discussed above, the configured subband size for the CQI feedback may be an integer multiple R of the FD unit size for the PMI feedback.

At 915, the UE calculates the CQI feedback for CQI subbands based on at least a portion of the corresponding first number of FD units for the PMI feedback. The portion of the number of FD units is based on alignment of the CQI subbands and the numbers of FD units for the PMI feedback. In some examples, the UE calculates the CQI based on the average CQI resulted by the PMIs for the corresponding FD units.

In some cases, the CQI subband mask and the PMI FD units mask may be configured separately. In this case, a CQI subband can have a size smaller than the configured CQI subband size. In some examples, at least one of the CQI subbands may be aligned with R' FD units, that is less than R FD units, of the first number of FD units for the PMI feedback. In the example shown in FIG. 7, R is equal to 2, in other words, the CQI subbands each correspond to two PMI FD units. As shown in FIG. 7, for the CQI subband configuration #1, the CQI subband 2 is only aligned with 1 PMI FD unit (PMI FD unit 7), thus, R'<R.

According to certain aspects, when the CQI subband size is smaller than the configured subband size, there may be only one PMI FD unit with the same size as the CQI subband. In some examples, when R'<R the UE calculates the CQI feedback for the at least one of the CQI subband based on the PMI for the R' aligned FD units. Thus, when there is only one PMI FD unit aligned with the CQI subband, only the one PMI FD unit may be used to calculate the CQI feedback. In the example shown in FIG. 7, for the CQI subband 4, the UE calculates the CQI based on the PMI resulting from PMI FD unit 7.

According to certain aspects, when R'<R, for the last one FD unit, the UE applies the PMI of an aligned FD units for the PMI feedback to an adjacent FD unit not configured for PMI feedback, the adjacent FD unit being aligned with the at least one of the second number of FD units. The UE calculates the CQI feedback for the at least one of the second number of FD units based on the PMI for the aligned FD units. In the example shown in FIG. 7, for the CQI subband 4, the UE replicates the PMI resulting from the PMI FD unit 7 to the FD unit 6, and the UE calculates the CQI based on averaging the estimate resulting from PMI FD unit 7.

In some cases R'=0, when the at least one CQI subband does not align with any PMI FD units. According to certain aspects, when R'=0, for the least one CQI subband, the UE treats it as an error case and does not transmit CQI for the CQI subband. In the example shown in FIG. 7, the CQI subbands in both of the illustrated CQI subband configuration #1 and CQI subband configuration #2 all have aligned PMI FD unit(s). However, in some cases for example the CQI subband 3 (not shown) in the CQI subband configuration #1 does not align with any PMI FD units. The UE treats it as an error case and does not transmit any CQI for the CQI FD unit 3.

In some cases, at least one PMI FD unit does not align with any CQI subbands. According to certain aspects, when the least one PMI FD unit does not align with any CQI subbands, the UE treats it as an error case and does not transmit PMI for the at least one FD unit. In the example shown in FIG. 7, the PMI FD unit does not align with any CQI subbands (for both the CQI subband configuration #1 and the CQI subband configuration #2). The UE treats it as an error case and does not transmit any PMI for the PMI FD unit 5.

Figure 10:
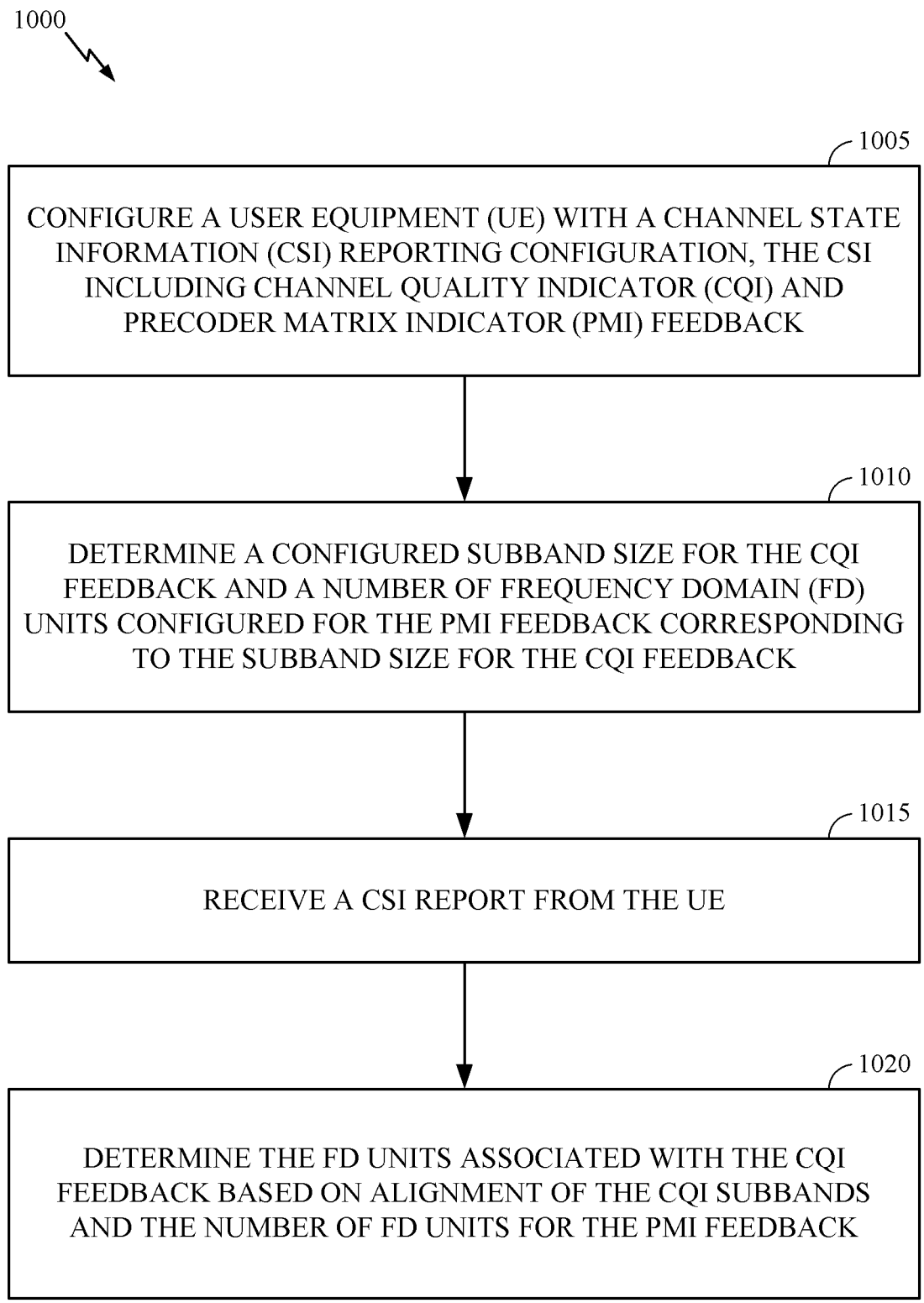
FIG. 10 is a flow diagram illustrating example operations by a BS for wireless communication, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., such as the BS 110a in the wireless communication network 100). The operations 1000 may be complimentary operations by the BS to the operations 900 performed by the UE. Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1005, by configuring a UE with a CSI reporting configuration. The CSI including CQI and PMI feedback. At 1010, the BS determines a configured subband size for the CQI feedback and a number of FD units configured for the PMI feedback corresponding to the subband size for the CQI feedback. At 1015, the BS receives a CSI report from the UE and, at 1020, the BS determines the FD units associated with the CQI feedback based on alignment of the CQI subbands and the number of FD units for the PMI feedback. For example, the BS may determine the CQI feedback applies to R or R' FD units based on a rule.

Figure 11:
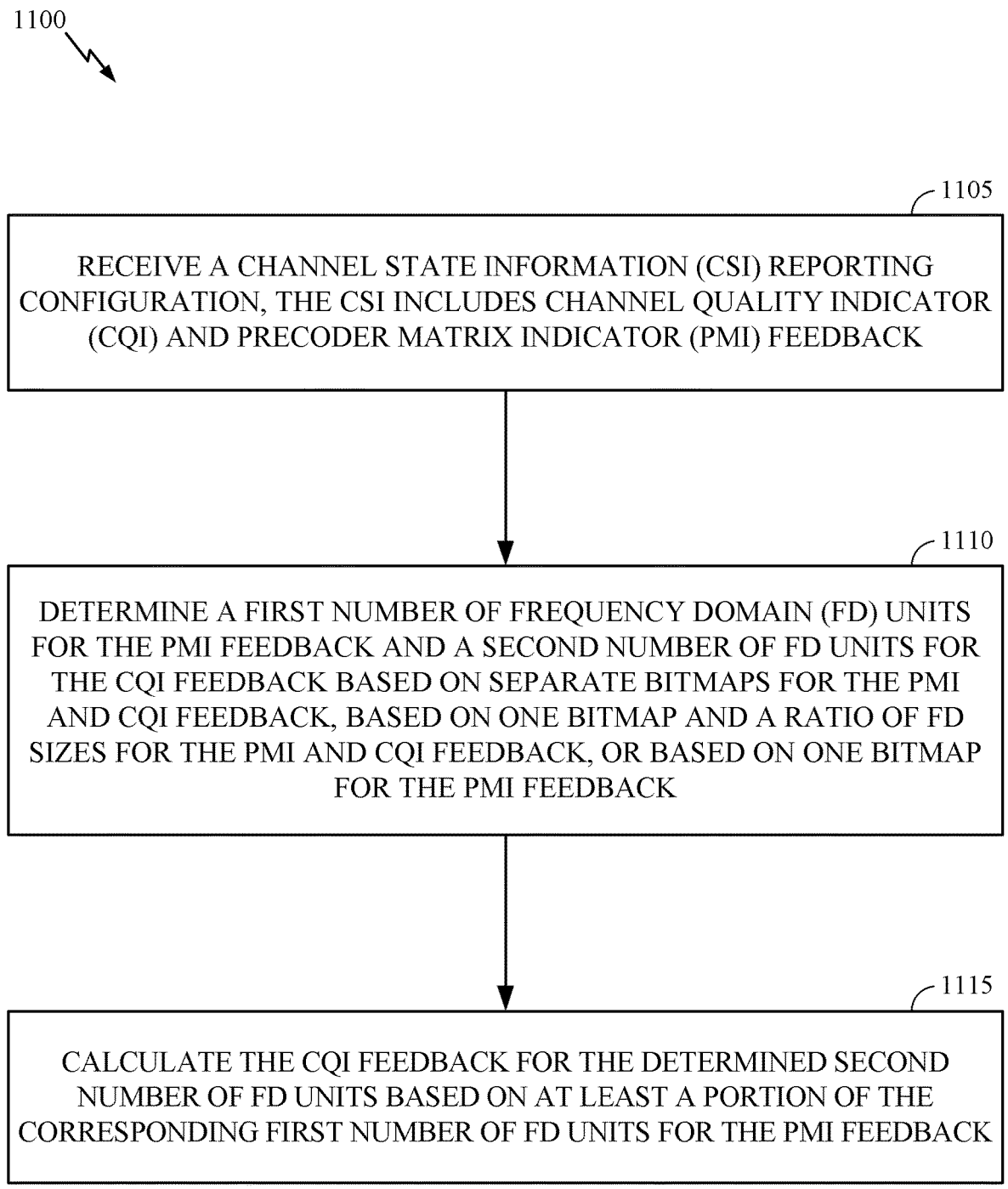
FIG. 11 is a flow diagram illustrating example operations by a UE for wireless communication, in accordance with certain aspects of the present disclosure.

FIG. 11 is a flow diagram illustrating example operations 1100 for configuring the PMI and CQI reporting bands, in accordance with certain aspects of the present disclosure.

The operations 1100 may begin, at 1105, by receiving a CSI reporting configuration. The CSI includes CQI and PMI feedback. The CSI report may indicate or be associated with a BWP. The BWP may be associated with one or more FD unit sizes.

At 1110, the UE determines a first number of FD units for the PMI feedback and a second number of FD units for the CQI feedback based on separate bitmaps for the PMI and CQI feedback, based on one bitmap and a ratio of FD unit sizes for the PMI and CQI feedback, or based on one bitmap for the PMI feedback. The FD units for the PMI feedback have first a FD unit size smaller (e.g., less RBs in an FD unit) than a second FD unit size for the CQI (i.e., the PMI may have a finer granularity than the CQI). In some examples, the FD unit sizes for the CQI and/or the PMI are indicated in the CSI report configuration and/or associated with the BWP. In some examples, the second FD unit size for the CQI feedback is an integer multiple R of the first FD unit size for the PMI feedback.

According to certain aspects, the UE receives separate bitmaps for the PMI and CQI feedback. R is the ratio of the length of the bitmap for PMI feedback to the length of the bitmap for CQI feedback. Each bit in the bitmap for the CQI feedback is associated with R bits in the bitmap for the PMI feedback, indicating that a configured CQI FD unit is associated with R' PMI FD units, where R' is the number of "1s" in the R bits.

According to certain aspects, the UE receives a bitmap for the CQI feedback and an indication of R. For example, the UE may receive a parameter (numberOfPMISubbandsPerCQISubband) indicating the value of R (e.g., a value of 1 or 2). The UE determines the second FD unit size for the CQI feedback is an integer multiple R first FD unit size for the PMI feedback. The UE determines the CQI for a CQI FD unit is associated with R PMI FD units. Based on the bitmap for the CQI feedback and the indication of R, the UE can determine the PMI FD units.

According to certain aspects, the UE receives a bitmap for the PMI feedback. The UE may determine the second FD unit size for the CQI feedback is an integer multiple R first FD unit size for the PMI feedback, where R is the ratio of the length of the bitmap for PMI feedback to the total number of CQI FD units in the BWP. The UE may determine that every R bits in the bitmap for PMI feedback indicates that R' FD units are associated with the CQI calculation for the corresponding CQI FD unit, where R' is the number of "1s" in the R bits.

At 1115, the UE calculates the CQI feedback for the second number of FD units based on at least a portion of the corresponding first number of FD units for the PMI feedback. In some examples, the UE calculates the CQI based on the average CQI resulted by the PMIs for the corresponding FD units.

Figure 12:
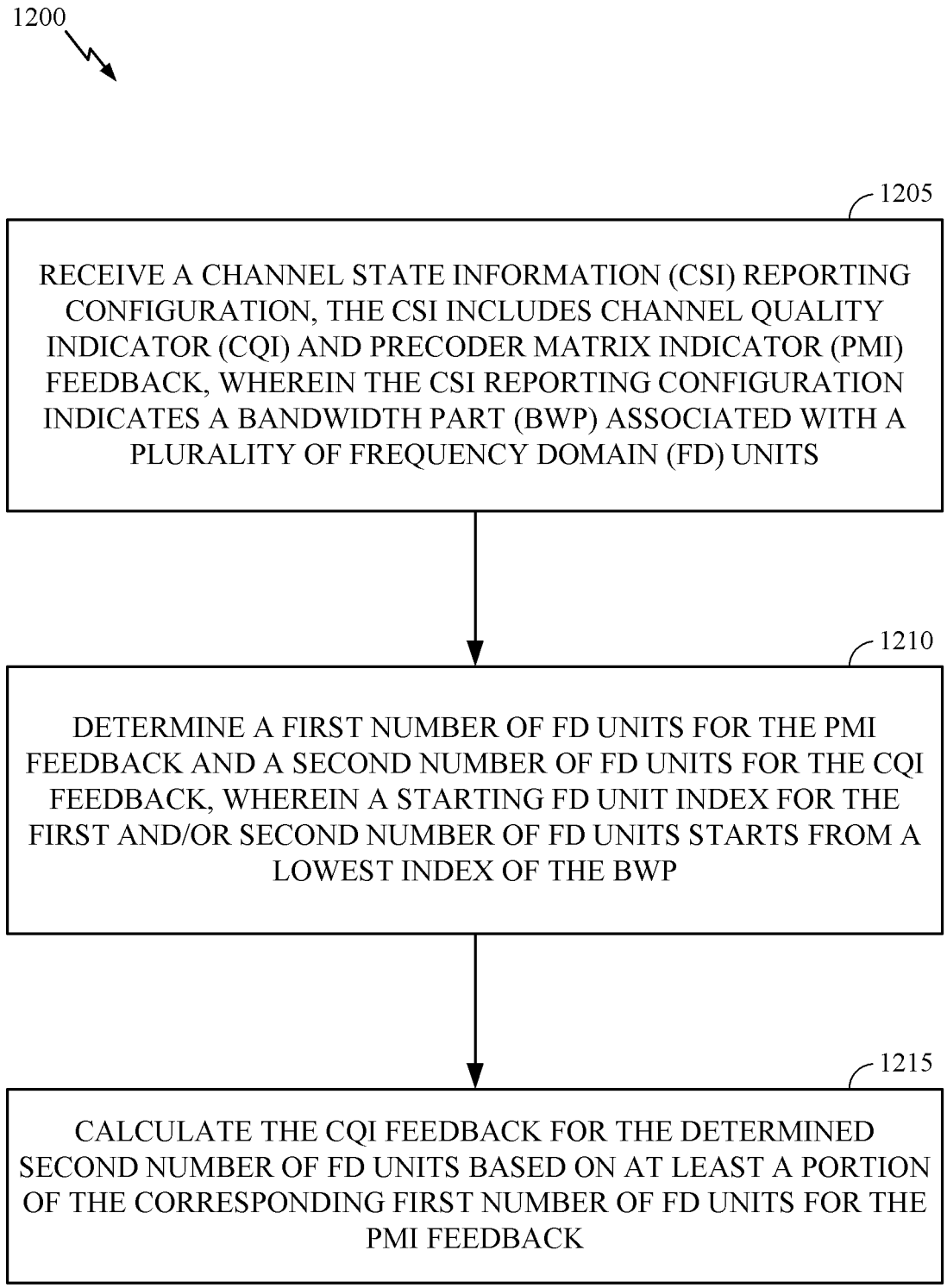
FIG. 12 is a flow diagram illustrating example operations by a UE for wireless communication, in accordance with certain aspects of the present disclosure.

FIG. 12 is a flow diagram illustrating example operations 1200 for configuring the PMI and CQI reporting bands, in accordance with certain aspects of the present disclosure.

The operations 1200 may begin, at 1205, by receiving a CSI reporting configuration. The CSI includes CQI and PMI feedback. The CSI reporting configuration indicates a BWP associated with a plurality of FD units.

At 1210, the UE determines a first number of FD units for the PMI feedback and a second number of FD units for the CQI feedback.

According to certain aspects, a starting FD unit index for the first and/or the second number of FD units starts from a lowest index of the BWP. In some examples, the first and/or second number of FD units starts from a lowest index of the system bandwidth. In some examples, one of the PMI or CQI FD units starts from the lowest FD unit index of the system bandwidth and the other one of the PMI or CQI FD units starts from the lowest FD unit index within the BWP.

At 1215, the UE calculates the CQI feedback for the determined second number of FD units based on at least a portion of the corresponding first number of FD units for the PMI feedback.

According to certain aspects, the UE may receive a CSI reporting configuration, the CSI including CQI and PMI feedback. The UE determines a first number of FD units for the PMI feedback and a second number of FD units for the CQI feedback. For CQI FD units associated with a number of PMI FD units R' that is less than a number of PMI FD units R, the UE pads one or more of the PMI FD units until R' is equal to R. The UE calculates the CQI feedback for the determined second number of FD units based on at least a portion of the corresponding first number of FD units for the PMI feedback.

The first number of FD units for the PMI feedback may have a first FD unit size smaller than a second FD unit size for the CQI. The second FD unit size for the CQI feedback may be an integer multiple R of the first FD unit size for the PMI feedback. At least one of the second number of FD units for the CQI feedback may be aligned with R' FD units less than R FD units of the first number of FD units for the PMI feedback.

Figure 13:
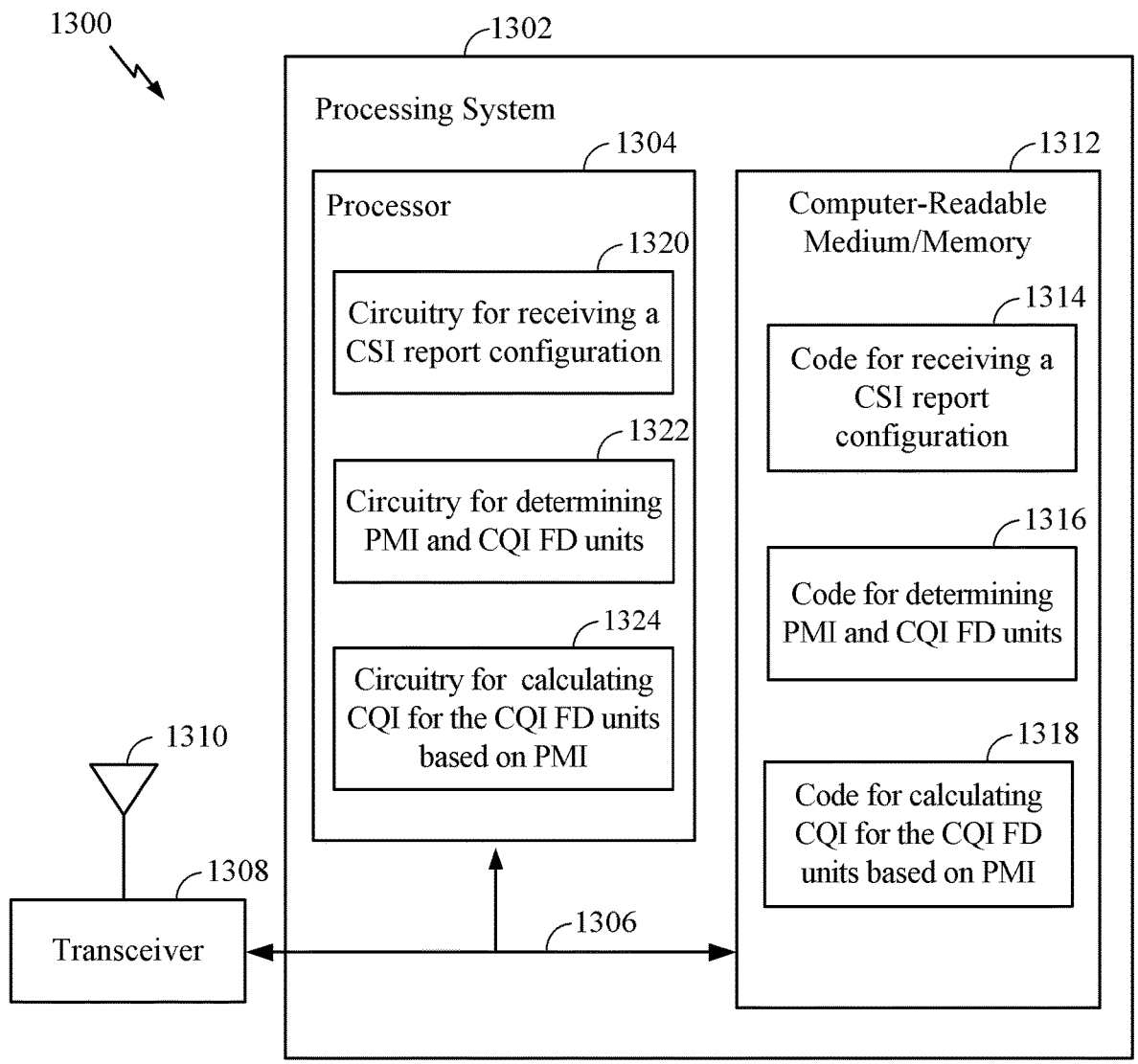
FIG. 13 illustrates a communications device that may include various components configured to perform operations for the techniques disclosed herein in accordance with aspects of the present disclosure.

FIG. 13 illustrates a communications device 1500 that may include various components (e.g., corresponding to means-plus-function components) configured to perform operations for the techniques disclosed herein, such as the operations illustrated in FIGS. 8, 9, 11, and/or 12. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1504 to perform the operations illustrated in FIGS. 8, 9, 11, and/or 12, or other operations for performing the various techniques discussed herein for CQI reporting for PMI FD units. In certain aspects, computer-readable medium/memory 1312 stores code 1314 for receiving a CSI report configuration in accordance with aspects of the present disclosure; code 1316 for determining CQI and PMI FD units, in accordance with aspects of the present disclosure; and code 1318 for calculating CQI for the CQI FD units based on PMI, in accordance with aspects of the present disclosure. In certain aspects, the processor 1304 has circuitry configured to implement the code stored in the computer-readable medium/memory 1312. The processor 1304 includes circuitry 1320 for receiving a CSI report configuration in accordance with aspects of the present disclosure; circuitry 1322 for determining CQI and PMI FD units, in accordance with aspects of the present disclosure; and circuitry 1324 for calculating CQI for the CQI FD units based on PMI, in accordance with aspects of the present disclosure.

Example Aspects

In a first aspect, a method for wireless communication by a user equipment (UE) includes receiving a channel state information (CSI) reporting configuration The CSI includes channel quality information (CQI) and precoder matrix indicator (PMI) feedback. The BS determines a configured subband size for the CQI feedback and a number of frequency domain (FD) units configured for the PMI feedback corresponding to the subband size for the CQI feedback. The BS calculates the CQI feedback for CQI subbands based on at least a portion of the corresponding number of FD units for the PMI feedback. The portion of the number of FD units being based on alignment of the CQI subbands and the number of FD units for the PMI feedback.

In a second aspect, in combination with the first aspect, the configured subband size for the CQI feedback is an integer multiple R of an FD unit size for the PMI feedback; and at least one of the CQI subbands is aligned with R' FD units less than R FD units of the number of FD units for the PMI feedback.

In a third aspect, in combination with one or more of the first and second aspects, the UE calculates the CQI feedback for the at least one of the CQI subbands based on the PMI for the R' FD units.

In a fourth aspect, in combination with one or more of the first through third aspects, the UE calculates the CQI feedback for the at least one of the CQI subbands based on the PMI for R' FD units.

In a fifth aspect, in combination with one or more of the first through fourth aspects, the at least one of the CQI subbands is aligned with none of the number of FD units for the PMI feedback; and the UE determines an error case and does not transmit CQI for the at least one of the CQI subbands.

In a sixth aspect, in combination with one or more of the first through fifth aspects, the CSI reporting configuration includes a bitmap configuring the CQI subbands.

In a seventh aspect, in combination with one or more of the first through sixth aspects, the UE determines FD units for the PMI feedback based on the bitmap and the configured number of FD units for the PMI feedback corresponding to the subband size for the CQI feedback.

In an eighth aspect, in combination with one or more of the first through seventh aspects, the CSI reporting configuration indicates a bandwidth part (BWP) associated with a plurality of FD units; and the UE determines FD units for the PMI feedback starting from a lowest resource block (RB) index of the BWP, determines the CQI subband starting from the lowest RB index of the BWP, or both.

In a ninth aspect, a method for wireless communication by a base station (BS) includes configuring a user equipment (UE) with a channel state information (CSI) reporting configuration. The CSI includes channel quality information (CQI) and precoder matrix indicator (PMI) feedback. The BS determining a configured subband size for the CQI feedback and a number of frequency domain (FD) units configured for the PMI feedback corresponding to the subband size for the CQI feedback. The BS receives a CSI report from the UE. The BS determines the FD units associated with the CQI feedback based on alignment of the CQI subbands and the number of FD units for the PMI feedback.

In a tenth aspect, in combination with the ninth aspect, the configured subband size for the CQI feedback is an integer multiple R of an FD unit size for the PMI feedback; and at least one of the CQI subbands is aligned with R' FD units less than R FD units of the number of FD units for the PMI feedback.

In an eleventh aspect, in combination with one or more of the ninth or tenth aspects, the BS determines the CQI feedback is associated with the R' FD units.

In a twelfth aspect, in combination with one or more of the ninth through eleventh, the BS determines the CQI feedback is associated with the R FD units.

In a thirteenth aspect, in combination with one or more of the ninth through twelfth aspects, the at least one of the CQI subbands is aligned with none of the number of FD units for the PMI feedback; and the BS determines an error case and the CQI feedback is not received.

In a fourteenth aspect, in combination with one or more of the ninth through thirteenth aspects, the CSI reporting configuration includes a bitmap configuring the CQI subbands.

In a fifteenth aspect, in combination with one or more of the ninth through fourteenth, the BS determines FD units for the PMI feedback based on the bitmap and the configured number of FD units for the PMI feedback corresponding to the subband size for the CQI feedback.

In a sixteenth aspect, in combination with one or more of the ninth through fifteenth aspects, the CSI reporting configuration indicates a bandwidth part (BWP) associated with a plurality of FD units; and the BS determines FD units for the PMI feedback starting from a lowest resource block (RB) index of the BWP, determines the CQI subband starting from the lowest RB index of the BWP, or both.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP).

cdma2000 and UMB are described in documents from an organization named "3rd Generation Partnership Project 2" (3GPP2).

In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU). A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving a channel state information (CSI) reporting configuration, the CSI including channel quality information (CQI) and precoder matrix indicator (PMI) feedback;
   determining a configured subband size for the CQI feedback and a number of frequency domain (FD) units configured for the PMI feedback corresponding to the subband size for the CQI feedback; and
   calculating the CQI feedback for CQI subbands based on at least a portion of the corresponding number of FD units for the PMI feedback, the portion of the number of FD units being based on alignment of the CQI subbands and the number of FD units for the PMI feedback.

2. The method of claim 1, wherein:
   the configured subband size for the CQI feedback is an integer multiple R of an FD unit size for the PMI feedback; and
   at least one of the CQI subbands is aligned with R' FD units less than R FD units of the number of FD units for the PMI feedback.

3. The method of claim 2, wherein calculating the CQI feedback comprises:
   calculating the CQI feedback for the at least one of the CQI subbands based on the PMI for the R' FD units.

4. The method of claim 2, wherein calculating the CQI feedback comprises:
   calculating the CQI feedback for the at least one of the CQI subbands based on the PMI for R FD units.

5. The method of claim 2, wherein:
   the at least one of the CQI subbands is aligned with none of the number of FD units for the PMI feedback; and
   calculating the CQI feedback comprises determining an error case and not transmitting CQI for the at least one of the CQI subbands.

6. The method of claim 1, wherein the CSI reporting configuration includes a bitmap configuring the CQI subbands.

7. The method of claim 6, further comprising determining FD units for the PMI feedback based on the bitmap and the configured number of FD units for the PMI feedback corresponding to the subband size for the CQI feedback.

8. The method of claim 1, wherein:
the CSI reporting configuration indicates a bandwidth part (BWP) associated with a plurality of FD units; and
the method further comprises:
determining FD units for the PMI feedback starting from a lowest resource block (RB) index of the BWP;
determining the CQI subband starting from the lowest RB index of the BWP, or
both.

9. A method for wireless communication by a base station (BS), comprising:
configuring a user equipment (UE) with a channel state information (CSI) reporting configuration, the CSI including channel quality information (CQI) and precoder matrix indicator (PMI) feedback;
determining a configured subband size for the CQI feedback and a number of frequency domain (FD) units configured for the PMI feedback corresponding to the subband size for the CQI feedback;
receiving a CSI report from the UE; and
determining the FD units associated with the CQI feedback based on alignment of the CQI subbands and the number of FD units for the PMI feedback.

10. The method of claim 9, wherein:
the configured subband size for the CQI feedback is an integer multiple R of an FD unit size for the PMI feedback; and
at least one of the CQI subbands is aligned with R' FD units less than R FD units of the number of FD units for the PMI feedback.

11. The method of claim 10, wherein determining the FD units comprises:
determining the CQI feedback is associated with the R' FD units.

12. The method of claim 10, wherein determining the FD units comprises:
determining the CQI feedback is associated with the R FD units.

13. The method of claim 10, wherein:
the at least one of the CQI subbands is aligned with none of the number of FD units for the PMI feedback; and
determining the FD units comprises determining an error case and the CQI feedback is not received.

14. The method of claim 9, wherein the CSI reporting configuration includes a bitmap configuring the CQI subbands.

15. The method of claim 14, further comprising determining FD units for the PMI feedback based on the bitmap and the configured number of FD units for the PMI feedback corresponding to the subband size for the CQI feedback.

16. The method of claim 9, wherein:
the CSI reporting configuration indicates a bandwidth part (BWP) associated with a plurality of FD units; and
the method further comprises:
determining FD units for the PMI feedback starting from a lowest resource block (RB) index of the BWP;
determining the CQI subband starting from the lowest RB index of the BWP, or
both.

17. An apparatus for wireless communication, comprising:
a memory; and
at least one processor coupled with the memory and configured to:
receive a channel state information (CSI) reporting configuration, the CSI including channel quality information (CQI) and precoder matrix indicator (PMI) feedback;
determine a configured subband size for the CQI feedback and a number of frequency domain (FD) units configured for the PMI feedback corresponding to the subband size for the CQI feedback; and
calculate the CQI feedback for CQI subbands based on at least a portion of the corresponding number of FD units for the PMI feedback, the portion of the number of FD units being based on alignment of the CQI subbands and the number of FD units for the PMI feedback.

18. The apparatus of claim 17, wherein:
the configured subband size for the CQI feedback is an integer multiple R of an FD unit size for the PMI feedback; and
at least one of the CQI subbands is aligned with R' FD units less than R FD units of the number of FD units for the PMI feedback.

19. The apparatus of claim 18, wherein the at least one processor is configured to calculate the CQI feedback for the at least one of the CQI subbands based on the PMI for the R' FD units.

20. The apparatus of claim 18, wherein the at least one processor is configured to calculate the CQI feedback for the at least one of the CQI subbands based on the PMI for R FD units.

21. The apparatus of claim 18, wherein:
the at least one of the CQI subbands is aligned with none of the number of FD units for the PMI feedback; and
the at least one processor is configured to determine an error case and not transmit CQI for the at least one of the CQI subbands.

22. The apparatus of claim 17, wherein the CSI reporting configuration includes a bitmap configuring the CQI subbands.

23. The apparatus of claim 22, wherein the at least one processor is further configured to determine FD units for the PMI feedback based on the bitmap and the configured number of FD units for the PMI feedback corresponding to the subband size for the CQI feedback.

24. The apparatus of claim 17, wherein:
the CSI reporting configuration indicates a bandwidth part (BWP) associated with a plurality of FD units; and
the at least one processor is further configured to:
determine FD units for the PMI feedback starting from a lowest resource block (RB) index of the BWP;
determine the CQI subband starting from the lowest RB index of the BWP, or
both.

25. An apparatus for wireless communication, comprising:
a memory; and
at least one processor coupled with the memory and configured to:
configure a user equipment (UE) with a channel state information (CSI) reporting configuration, the CSI including channel quality information (CQI) and precoder matrix indicator (PMI) feedback;

determine a configured subband size for the CQI feedback and a number of frequency domain (FD) units configured for the PMI feedback corresponding to the subband size for the CQI feedback;
receive a CSI report from the UE; and
determine the FD units associated with the CQI feedback based on alignment of the CQI subbands and the number of FD units for the PMI feedback.

26. The apparatus of claim 25, wherein:
the configured subband size for the CQI feedback is an integer multiple R of an FD unit size for the PMI feedback; and
at least one of the CQI subbands is aligned with R' FD units less than R FD units of the number of FD units for the PMI feedback.

27. The apparatus of claim 26, wherein the at least one processor is configured to determine the CQI feedback is associated with the R' FD units.

28. The apparatus of claim 26, wherein the at least one processor is configured to determine the CQI feedback is associated with the R FD units.

29. The apparatus of claim 26, wherein:
the at least one of the CQI subbands is aligned with none of the number of FD units for the PMI feedback; and
the at least one processor is configured to determine an error case and the CQI feedback is not received.

30. The apparatus of claim 25, wherein the CSI reporting configuration includes a bitmap configuring the CQI subbands.

* * * * *